(No Model.)
H. M. PAINE.
SYSTEM OF CONVERSION OF ELECTRICAL ENERGY INTO MECHANICAL FORCE.
No. 363,669. Patented May 24, 1887.
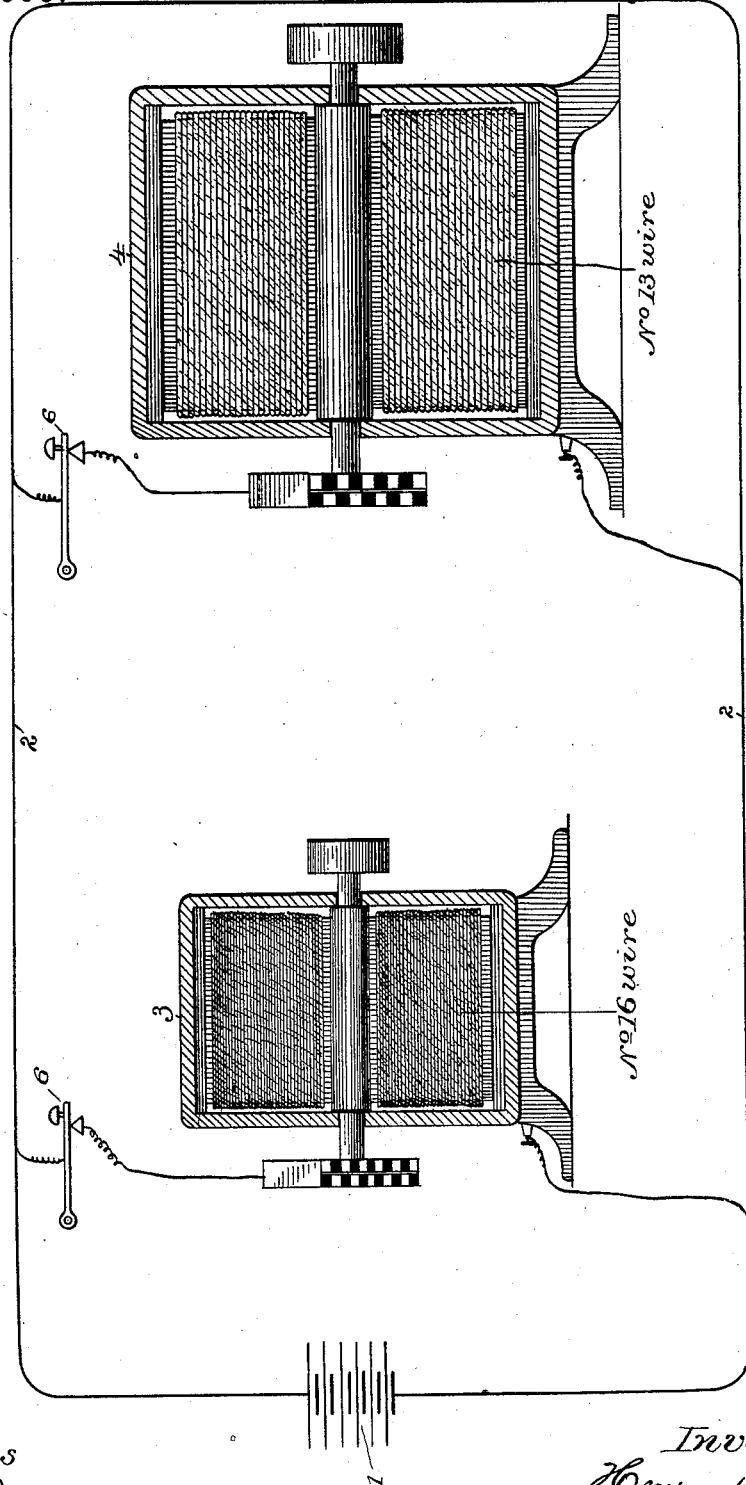
Witnesses
Inventor
Henry M. Paine
by A. M. Tanner
Atty.

UNITED STATES PATENT OFFICE.

HENRY M. PAINE, OF NEWARK, NEW JERSEY.

SYSTEM OF CONVERSION OF ELECTRICAL ENERGY INTO MECHANICAL FORCE.

SPECIFICATION forming part of Letters Patent No. 363,669, dated May 24, 1887.

Application filed January 14, 1887. Serial No. 224,342. (No model.)

*To all whom it may concern:*

Be it known that I, HENRY M. PAINE, a citizen of the United States, residing at Newark, in the county of Essex and State of New Jersey, have invented certain new and useful Improvements in Systems of Conversion of Electrical Energy into Mechanical Force; and I do hereby declare the following to be a full, clear, and exact description of the invention, such as will enable others skilled in the art to which it appertains to make and use the same.

The present invention relates to a system of working electric motors having paramagnetic cores or limbs wound with insulated wire; and it consists in combining with a source of electric power of a given electro motive force and its circuit several electric motors of varying sizes or dimensions, in which the same electrical resistance is maintained by a special mode of winding, as will be hereinafter fully set forth.

In the accompanying drawing the figure is a diagram view of an electric-motor system embracing a voltaic generator, its circuit, and several different-sized motors included in the latter.

It is well known to electricians that the electrical resistance in wire is as the diameter and length. Now, taking two hundred and thirty feet No. 16 wire, with a resistance of one ohm, to wind a magnet limb or core six by one-half by three, six elements (Bunsen's) on this limb give a potential value of three hundred and sixty foot pounds. Now, five hundred feet of No. 13 wire have the same resistance as the two hundred and thirty feet of wire, but will wind a magnet whose dimensions are twelve by one by three, and the potential value of which will be nine hundred and twenty foot pounds. I have carried these ratios—the battery-elements being a constant factor—through ranges of magnet dimensions consisting of six inches, twelve inches, and twenty-four inches, and have found the ratio of increase to be constant. When it is understood that the preservation of the same resistance in the electro-magnets of different-sized motors satisfies all the requirements of a battery of six elements to the full extent of its hitherto considered potential energy or electromotive force, we have a result by thus proportioning the wire to its length heretofore not attained.

In the drawing, the reference-numeral 1 designates a voltaic generator, from which run the mains 2, which serve to feed two or more electric motors, 3 and 4, arranged in the present instance in parallel or multiple arc. These motors vary in size, the one marked 3 having, for example, magnetic cores of the dimensions first mentioned and being wound with No. 16 wire, and the other motor, 4, being larger and wound with No. 13 wire.

It is understood that by proportioning the size of wire to the dimensions of the cores of the magnets that the requisite number of wire coils can be wound upon said cores in order to obtain the maximum magnetizing power of the electro-magnets with an electric source of a given electro motive force. It is also understood that suitable switches, 6, can be located in the motor-circuits for the purpose of throwing either one of the motors out of action.

While I have shown only two motors in the present instance and a voltaic generator, it is obvious that I may include in the exterior circuit of a dynamo-electric machine any desired number of motors of varying dimensions in which the winding of the magnets is carried out in accordance with the rules above laid down—viz., the maintenance of the same electric resistance in all motors, irrespective of size or dimensions, and the use in connection with a series of such motors of an electric source of a given electro-motive force.

The advantages derived by my system of winding different-sized electric motors is that the same electric circuit may be tapped or used to provide the means of working power machinery—such as lathes and planing-machines—as well as sewing-machines.

Furthermore, it is frequently an advantage to make use of light or small motors where larger ones are not desirable or cannot be used for want of space or other local circumstances. This can be done in my system without changing the electric generator. It is also a feature of my system that by proportioning the winding of several motors so as to maintain the same electrical resistance in each motor there cannot be an undue heating of the wires, since each and every motor, whether small or large, is adapted to the strength of the same electric generator.

I am aware that prior to my invention coarser wire has been used on the limbs of motor-magnets of larger dimensions than on limbs of lesser measurement. Such usage, however, has not been predicated upon the condition of equal resistance in the different dimensions of the motors, as in all cases known to me the electro-motive force has been increased in the ratio of the dimensions, while by my method a greater efficiency is obtained from a given electro-motive force in a large motor than in a smaller one by winding the larger magnet-limbs with a number wire sufficiently lower than that of the lesser to compensate the extra length required to wind the same number of coils on each, and thus an equal electrical resistance is the result.

My experiments have determined that five volts of electro-motive force and five ohms of resistance, considered as constant factors and the units of measurement, more than double the efficiency of the motor, as its proportions are doubled, and it is this proportioning of the electro-motive force, resistance, and dimensions in the manner set forth that constitutes my method, and any considerable variation from the formula stated by me will give inferior results. The units of measurement above set forth are arbitrary as regards force and resistance, and they may read 6, 8, 10, or other number; but having determined the number of electric force that gives the best results on a motor of given dimensions, then the maximum efficiency of such force is obtained by increasing the dimensions of the motor under the conditions of resistance set forth.

Having thus described my invention, what I claim as new is—

The combination, with an electric generator of a given electro-motive force and a circuit or electric mains, of a plurality of electric motors varying in size, and having their electro-magnets of different dimensions, wound with wire of such length and size as to maintain the same electrical resistance in the respective motors, and adapt the latter for use with the same electric generator or source of electrical energy of a given electro motive force, as and for the purpose herein set forth.

In testimony whereof I affix my signature in presence of two witnesses.

HENRY M. PAINE.

Witnesses:
EDWIN M. WIGHT,
ARTHUR P. HINMAN.